US006675277B2

(12) United States Patent
West et al.

(10) Patent No.: US 6,675,277 B2
(45) Date of Patent: Jan. 6, 2004

(54) METHOD AND APPARATUS FOR DEMAND USABLE ADAPTER MEMORY ACCESS MANAGEMENT

(75) Inventors: Karlon K. West, Austin, TX (US); Lynn P. West, Austin, TX (US)

(73) Assignee: TNS Holdings, Inc., Austin, TX (US)

( * ) Notice: Subject to any disclaimer, the term of this patent is extended or adjusted under 35 U.S.C. 154(b) by 8 days.

(21) Appl. No.: 09/912,954

(22) Filed: Jul. 25, 2001

(65) Prior Publication Data

US 2002/0016899 A1 Feb. 7, 2002

Related U.S. Application Data

(60) Provisional application No. 60/220,974, filed on Jul. 26, 2000, and provisional application No. 60/220,748, filed on Jul. 26, 2000.

(51) Int. Cl.[7] ............... G06F 12/00; G06F 12/10
(52) U.S. Cl. ............... 711/202; 711/2; 711/115; 711/121; 711/147; 711/206
(58) Field of Search ............... 711/2, 115, 121, 711/147, 202, 206, 208, 170–173

(56) References Cited

U.S. PATENT DOCUMENTS

| 4,486,834 | A | | 12/1984 | Kobayashi et al. ......... 711/148 |
|---|---|---|---|---|
| 5,568,609 | A | | 10/1996 | Sugiyama et al. ........... 711/43 |
| 5,604,882 | A | | 2/1997 | Hoover et al. .............. 711/121 |
| 5,765,157 | A | | 6/1998 | Lindholm et al. .......... 707/101 |
| 5,860,142 | A | * | 1/1999 | Cepulis ..................... 711/202 |
| 5,860,157 | A | * | 1/1999 | Cobb ........................ 711/103 |
| 6,003,123 | A | * | 12/1999 | Carter et al. .............. 711/207 |
| 6,098,123 | A | * | 8/2000 | Olnowich .................... 710/41 |
| 6,263,408 | B1 | * | 7/2001 | Anderson et al. .......... 711/144 |
| 6,427,195 | B1 | | 7/2002 | McGowen et al. ......... 714/153 |

FOREIGN PATENT DOCUMENTS

EP 0 602 791 A2 6/1994

OTHER PUBLICATIONS

International Search Report dated Jul. 16, 2002.
International Search Report dated Jun. 5, 2002.
Bershad, et al., "The Midway Distributed Shared Memory System" Compcon Digest of Papers, pp. 528–537, Feb. 22, 1993.
Wilson, et al. "Hardware Assist for Distributed Shared Memory" Proceedings of the International Conference on Distributed Computing Systems, pp. 246–255, May 25, 1993.

(List continued on next page.)

Primary Examiner—Mano Padmanahan
Assistant Examiner—Jasmine Song
(74) Attorney, Agent, or Firm—Gray Cary Ware & Freidenrich LLP

(57) ABSTRACT

A method and apparatus for using a memory adapter may allow a system to access the memory adapter. The memory adapter may comprise a list of entries for data within the memory adapter. Each entry may include an adapter memory segment offset, a segment length, a segment status, and a corresponding system memory address. The adapter memory segment offset may be the location of the offset within the memory adapter. A processor may access the adapter memory segment offsets through the system address space. The method and apparatus may be used to perform functions, such as read adapter memory, write adapter memory, insert adapter memory segment, remove an adapter memory segment, scan for an adapter memory segment, scan for a removable adapter memory segment, and potentially other functions.

7 Claims, 3 Drawing Sheets

OTHER PUBLICATIONS

Songnian, et al. "Heterogeneous Distributed Shared Memory," IEEE Transactions on Parallel and Distributed Systems, vol. 3, No. 5, pp. 540–554, Sep. 1, 1992.

Nitzberg, et al. "Distributed Shared Memory: A Survey of Issues and Algorithms," IEEE Computer Society, pp. 52–60, Aug. 1, 1991.

Stumm, et al. "Algorithms Implementing Distributed Shared Memory," IEEE Computer Society, pp. 54–64, May 1, 1990.

Ananthanarayanan, et al. "Experiences in Integrating Distributed Shared Memory with Virtual Memory Management," Operating Systems Review, vol. 26, No. 3, pp. 4–26, Jul. 1, 1992.

Bisiani, et al., PLUS: A Distributed Shared–Memory System, Proceedings of the Annual International Symposium on Computer Architecture, pp. 115–124, May 28, 1990.

Levelt, "A Comparison of Two Paradigms for Distributed Shared Memory," Software Practice & Experience, vol. 22, No. 11, pp. 985–1010, Nov. 1, 1992.

Ramachandran, et al. "Programming with Distributed Shared Memory," Proceedings of the Annual International Computer Software and Applications Conference, vol. Conf. 13, pp. 176–183, Sep. 20, 1989.

* cited by examiner

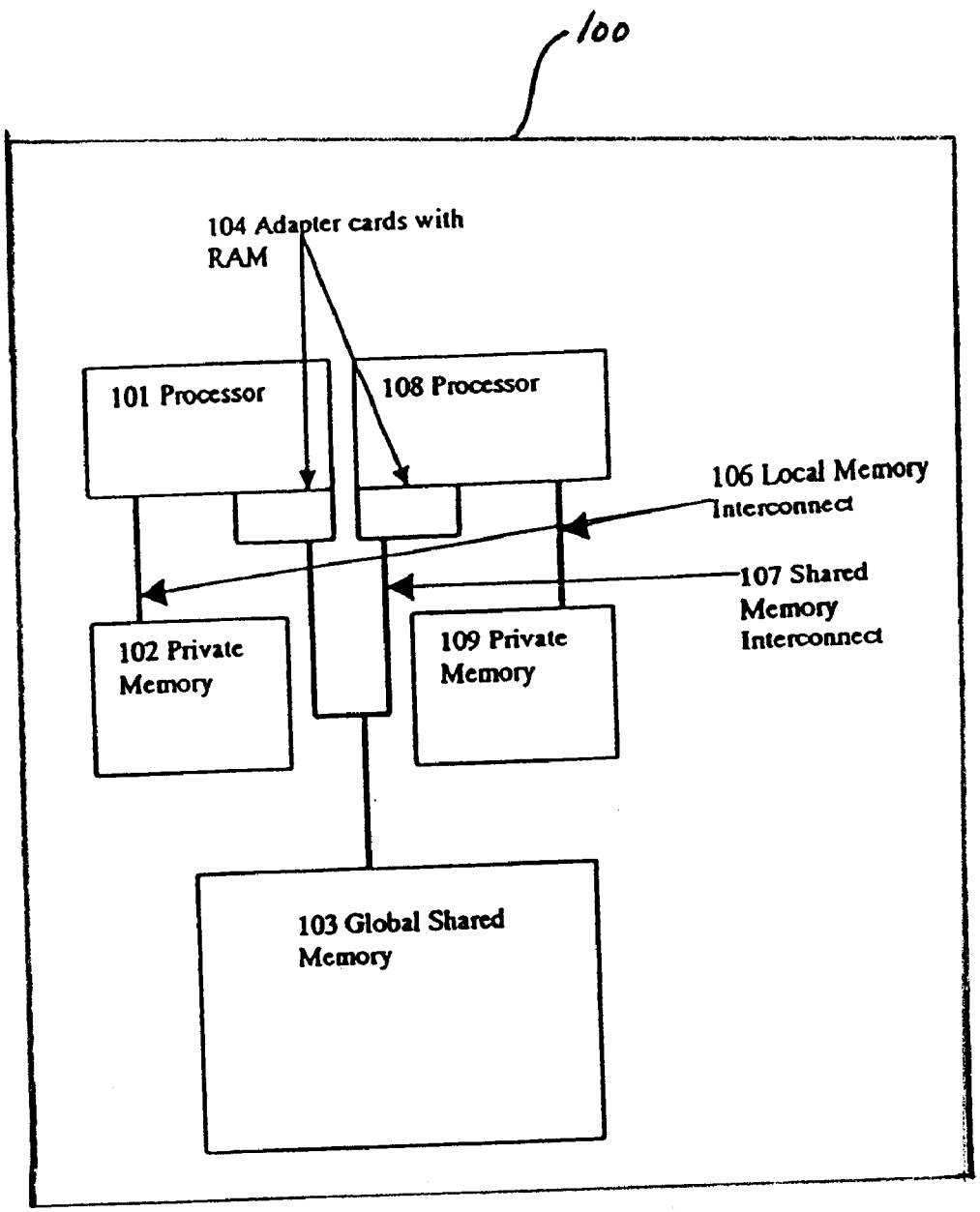
FIG.1 A TWO CPU COMPUTERSYSTEM

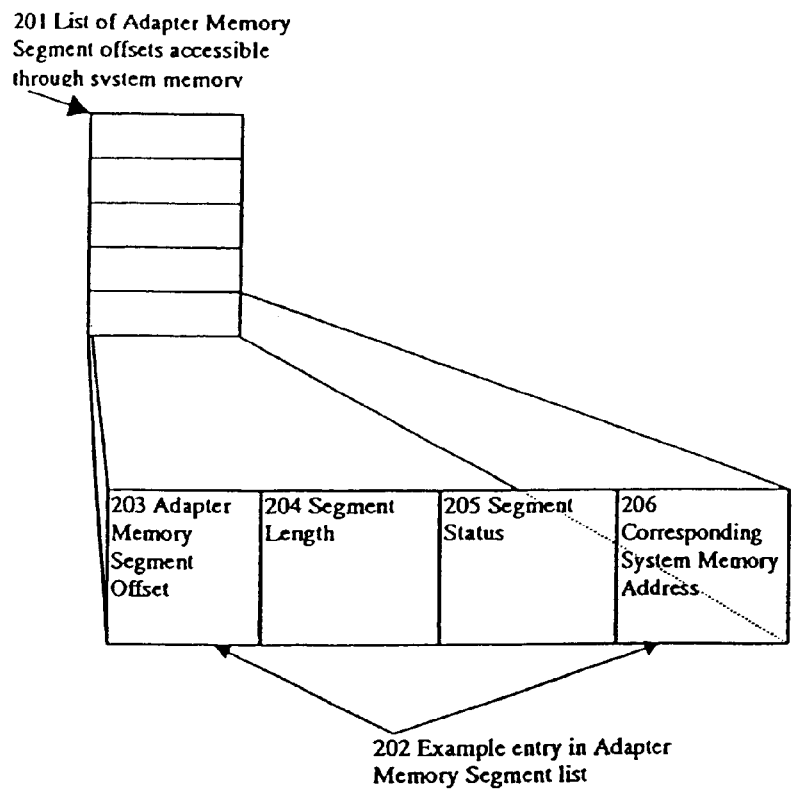
FIG. 2 KEY ELEMENTS OF A SOFTWARE SUBSYSTEM

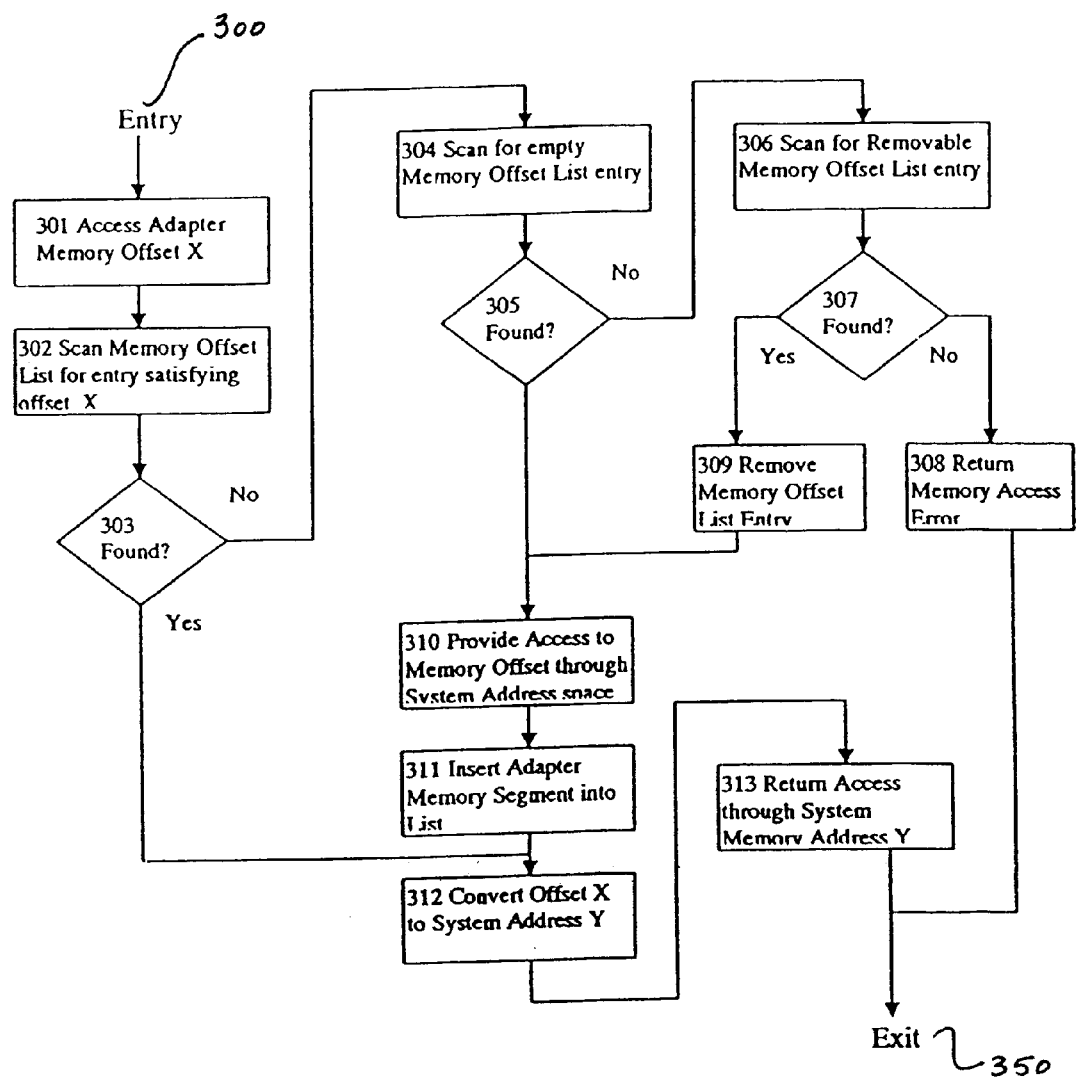
FIG. 3  DECISION FLOW OF AN APPLICATION TO MANAGE ADAPTER MEMORY USAGE

METHOD AND APPARATUS FOR DEMAND USABLE ADAPTER MEMORY ACCESS MANAGEMENT

CROSS-REFERENCES TO RELATED APPLICATIONS

This application is a continuation-in-part of, and claims a benefit of priority under 35 U.S.C. 119(e) and/or 35 U.S.C. 120 from, copending U.S. Ser. No. 60/220,974, filed Jul. 26, 2000, and No. 60/220,748, also filed Jul. 26, 2000, the entire contents of both of which are hereby expressly incorporated by reference for all purposes.

BACKGROUND OF THE INVENTION

1. Field of the Invention

The invention relates generally to the field of multiprocessor, shared resource computer systems. More particularly, the invention relates to computer systems that include one or more adapters containing Random Access Memory (RAM) connected by an Input/Output (I/O) bus to one or more processors within the computer system.

2. Discussion of the Related Art

In a typical computer system, the operating system, or some portion thereof, generally allows software running within a memory address space to access RAM located on adapter cards via the computer system's I/O buses.

Some operating systems provide two or more distinct address spaces that can be used by software running on a computer system, one of which is sometimes called the "system" or "kernel" address space. This address space is usually designed such that all processes or all threads running on the computer system maintain the same logical view of memory addresses that are in the system address space. Operating systems generally reserve a limited, though sometimes configurable amount of system resources to allow RAM located on adapter cards to be accessed through the "system" or "kernel" address space. If the maximum amount of system resources that can be configured on a computer system is not sufficient to allow access to the totality of RAM located on adapter cards, then either the RAM is not accessed at all, or the software needing access to the adapter-based RAM must facilitate accessing sections of adapter-based RAM individually, one at a time, thereby reducing overall system performance.

As a result of the above discussion, the amount of RAM that can be accessed through a system address space is directly proportionate to the amount of system resources allocated by an operating system for such purposes. Hence, a problem with this technology has been that limitations are imposed on the amount of RAM on adapter cards that can be accessed through a system address space because operating systems offer limited system resources to software requesting access to RAM on adapter cards. Therefore, what is required is a solution that obviates this restriction on the amount of RAM on adapter cards that can be accessed through a system address space.

Heretofore, the requirement of the ability to access a maximum amount of RAM located on adapter cards through a system address space while using limited system resources provided by an operating system has not been fully met. What is needed is a solution that addresses this requirement.

SUMMARY OF THE INVENTION

There is a need for the following embodiments. Of course, the invention is not limited to these embodiments.

According to a first aspect of the invention, a method comprises: receiving a request to access a memory card address that lies outside a processor access range; scanning a data structure including a list of adapter memory segment offsets, each adapter memory segment offset associated with a memory adapter, for a suitable adapter memory segment offset; determining if a suitable adapter memory offset is available; converting the suitable adapter memory offset to a system address; and providing a processor with access to the suitable adapter memory offset via the system address. According to a second aspect of the invention, a method, comprises: scanning a data structure including a list of adapter memory segment offsets, each adapter memory segment offset associated with a memory adapter, for an empty entry; determining if an empty entry is available; providing access to the empty entry through a system address space; writing a new adapter memory segment offset into the list of adapter memory segment offsets at the empty entry; converting the new adapter memory segment offset to a system address; and providing a processor with access to the new adapter memory segment offset via the system address. According to a third aspect of the invention, a method, comprises: scanning a data structure including a list of adapter memory segment offsets, each adapter memory segment offset associated with a memory adapter, for a removable entry; determining if a removable entry is available; removing the removable entry from the list of adapter memory segment offsets, thus creating an empty entry; providing access to the empty entry through a system address space; writing a new adapter memory segment offset into the list of adapter memory segment offsets at the empty entry; converting the new adapter memory segment offset to a system address; and providing a processor with access to the new adapter memory segment offset via the system address. According to a fourth aspect of the invention, an apparatus comprises: a processor; a memory adapter, coupled to the processor; a memory coupled to the processor; and a data structure, stored in the memory, including a list of adapter memory segment offsets defining a first class of segment offsets and a second class of segment lengths. These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/ or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein like reference numerals (if they occur in more than one view) designate the same elements. The invention may be better understood by reference to one or more of these drawings in combination with the description presented herein. It should be noted that the features illustrated in the drawings are not necessarily drawn to scale.

FIG. 1 illustrates a block diagram view of a computer system, representing an embodiment of the invention.

FIG. 2 illustrates a schematic view of a data structure, representing an embodiment of the invention.

FIG. 3 illustrates a flow diagram of a process that can be implemented by a computer program, representing an embodiment of the invention.

DESCRIPTION OF PREFERRED EMBODIMENTS

The invention and the various features and advantageous details thereof are explained more fully with reference to the nonlimiting embodiments that are illustrated in the accompanying drawings and detailed in the following description. Descriptions of well known components and processing techniques are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this detailed description.

The below-referenced U.S. Patent Applications disclose embodiments that were satisfactory for purposes for which they are intended. The entire contents of U.S. Ser. No. 09/273,430, filed Mar. 19, 1999; Ser. No. 09/859,193 filed May 15, 2001; Ser. No. 09/854,351, filed May 10, 2001; Ser. No. 09/672,909, filed Sep. 28, 2000; Ser. No. 09/653,189, filed Aug. 31, 2000; Ser. No. 09/652,815, filed Aug. 31, 2000; Ser. No. 09/653,183, filed Aug. 31, 2000; Ser. No. 09/653,425, filed Aug. 31, 2000; Ser. No. 09/653,421, filed Aug. 31, 2000; Ser. No. 09/653,557, filed Aug. 31, 2000; Ser. No. 09/653,475, filed Aug. 31, 2000; Ser. No. 09/653,429, filed Aug. 31, 2000; Ser. No. 09/653,502, filed Aug. 31, 2000; Ser. No. 09/912,834, filed Jul. 25, 2001; Ser. No. 09/012,872, filed Jul. 25, 2001; Ser. No. 09/915,109, filed Jul. 25, 2001; Ser. No. 09/912,856, filed Jul. 25, 2001; Ser. No. 09/915,001, filed Jul. 25, 2001; Ser. No. 09/912,870, filed Jul. 25, 2001; Ser. No. 09/912,898, filed Jul. 25, 2001; and Ser. No. 09/912,833, filed Jul. 25, 2001, are hereby expressly incorporated by reference herein for all purposes.

The context of the invention can include computer systems such as single processor systems, symmetric multiprocessor systems (SMP), and other distributed computer systems, such as cc-NUMA and cluster systems, the computer systems featuring associated RAM located on adapter cards, wherein software running on the computer systems require access to the RAM located on adapter cards through a system address space, resources for which are controlled by a suitable operating system.

In a computer system for which the memory (RAM) subsystem or a portion thereof is connected to one or more central processing units (CPU) by an extended I/O bus, separate from the computing system's main memory bus, methods and apparatus are disclosed for reducing software resource utilization, and methods to efficiently and correctly access the totality of the memory located on adapters connected to the computer system via an extended I/O bus.

In a computer system where memory can be located on adapter cards, as well as on the main system memory bus, some method of allowing software running on that computer system to access the memory on the adapter cards is usually provided. Current generation computing systems also provide a method to allow all the processes or threads running on the computer system to view the RAM subsystem, or a portion thereof, in the same memory space, typically called the "system" or "kernel" address space.

In a computing system where there are limited resources allocated to allow adapter-based RAM to be accessed in the "system" address space, and the limited resources cannot be configured in such a way as to allow access to the totality of adapter-based RAM in the "system" address space, methods and apparatus are disclosed to allow access to the totality of adapter-based RAM within the confines of limited system resources provided to allow access to that RAM in the "system" address space.

Scardamalia et al in U.S. Pat. No. 6,295,571 have described a system in which each computer node has its own, private memory, but in which there are also adapter cards that represent to the computer nodes as having some memory located on them. Such a computer system can be designed such that the amount of RAM the adapter cards present to the computer system is greater than the limited system resources can provide access to in the "system" address space. FIG. 1 shows an example of such a computer system, with multiple CPUs, each with private RAM as well as an adapter card that presents RAM to the CPU. However, the methods described herein apply equally to computer systems that contain only a single CPU, as well as SMP-based computer systems With reference to FIG. 1, a two CPU computer system 100 is shown. The two CPU computer system 100 includes a first processor 101 and a second processor 108. The first processor 101 is coupled to a first private memory unit 102 via a local memory interconnect 106. The second processor is coupled to a second private memory unit 109 via the local memory interconnect 106 (the local memory interconnect 106 is shown in FIG. 1 as two separate links, however a single bus may be used). Adapter cards with RAM 104 are coupled to both the first processor 101 and the second processor 108. The adapter cards with RAM 104 are coupled to a global shared memory unit 103, via a shared memory interconnect 107.

Still referring to FIG. 1, element 101 is a standard CPU. This figure represents a system in which the CPUs do not have access to the private memories of the other CPUs, but it will be obvious to one skilled in the art, that even if a private memory can be accessed by more than one CPU, the enhancements produced by the invention will still apply. Element 103 is the global shared memory that is accessible, and accessed, by a plurality of CPUs. Element 104 shows the adapter cards with on-board RAM present for each CPU. Element 106 is merely the connection fabric between CPUs and their private memories, and element 107 is the connection fabric between adapter cards and global shared memory. The computer system described by this figure shows these two interconnect fabrics as being separate, but access to private memory and global shared memory could share the same interconnect fabric. Also, the adapter cards that present RAM to the CPU do not need to be connected to a global shared memory area. They may be connected to networks, I/O devices, etc.

With reference to FIG. 2, entries in a sorted array comprising a list of adapter memory offsets accessible through system memory 201 is shown. Of course, a sorted array is shown here only by way of preference; other data structures such as queues, stacks, arrays, heaps, circular linked lists, trees, and tables may also be used. An example entry 202 shown here includes information in four fields. The number of fields included in each entry is a design consideration to aid in efficient organization of adapter memory. The four fields included in the example entry 202 are adapter memory segment offset 203, segment length 204, segment status 205, and a corresponding system memory address 206.

Still referring to FIG. 2, element 201 is a data structure that maintains a list of adapter memory segment offsets which may be accessed through system address space. Also shown is a list of five entries, but it is obvious to one skilled in the art that more than five or fewer than five entries may be used. It is also obvious to one skilled in the art that either a fixed number of entries, or a dynamically or load time configurable number of entries may be used.

Element 202 is an example entry in the list referenced by element 201. Elements 203 through 206 represent some of the information used to implement the techniques described herein. It is obvious to one skilled in the art that other information, including but not limited to, entry usage counts, entry reference counts, etc., may be used.

Element 203 is an offset of the memory located on the adapter card. Element 204 is the length or size of the adapter memory segment currently accessible through the system address space. It is obvious to one skilled in the art that either fixed-length entries, or size-configurable entries could be used. Element 205 is the status of the current adapter memory segment, maintaining information that includes, but is not limited to, an in-use flag or the current entry, a permanence flag determining if this segment may be removed from the system address space, etc. Element 206 is the system address space that corresponds to the adapter memory segment for this entry.

There are many different algorithms that one skilled in the art can use to implement the data structures shown in FIG. 2 and the key functions described above. Algorithms include, but are not limited to, a Queue, a Linked List, a Tree, etc. For purposes of describing the functionality of the invention, a sorted array is used in the example, i.e., the Adapter Memory Segment List is a sorted array of different Memory Segments.

Referring to FIG. 3, a decision flow of an application to manage adapter memory usage is shown. The decision flow shown includes functions to read adapter memory, write adapter memory, insert adapter memory segment, remove an adapter memory segment, scan for an adapter memory segment, and scan for a removable adapter memory segment. The decision flow is started 300 when software running on a computer system requests access to adapter memory marked by offset X 301 through system memory. Upon receipt of this request for access to adapter memory marked by offset X 301, control passes to a function to scan a data structure containing an adapter memory offset list (such a data structure containing a memory offset list is shown in FIG. 2), in search of the offset X 302. Control then determines whether a matching offset is found 303.

If a matching offset is found, control passes to a function which converts adapter memory offset X into a system address Y 312. The decision flow then returns a system address Y through which the requesting software can access the adapter memory segment marked by offset X 313. Control then exits the decision flow 350.

If a matching offset is not found, control passes to a function to scan the adapter memory offset list for an empty adapter memory offset list entry 304. Control then passes to a function to determine if an empty adapter memory offset list entry is found 305. If an empty adapter memory offset list entry is found, control passes to a function to provide access to this memory offset through system address space 310. A new adapter memory segment is thus generated and written into the list 311. Control then passes to functions 312 and 313 to convert the newly written offset into a system address and to return this system address to the requesting software, and finally to exit the decision flow 350. If an empty adapter memory offset list entry is not found, control passes to a function to scan for a removable memory offset list entry 306. Control then passes to a function to determine whether a removable memory offset list entry is found 307. If a removable memory offset list entry is found, control passes to a function to remove the removable memory offset list entry 309. Control then passes to functions 310, 311, 312, and 313 to write a new memory offset list entry to replace then one removed by function 309 and convert the address of the newly written memory offset list entry into a system address which is returned to the requesting software prior to control exiting the decision flow 350. If a removable memory offset list entry is not found, then control passes to a function to return a memory access error message to the requesting software 308. Control then exits the decision flow 350. FIG. 3 shows a decision flow of an application attempting to read adapter memory. The decision flow to ensure adapter memory can be accessed through system address space is identical for an application attempting to read or write to adapter memory. With reference thereof, element 301 is the function call the application uses to access (read or write) adapter memory with offset X.

If a matching offset is not found, control passes to a function to scan the adapter memory offset list for an empty adapter memory offset list entry 304. Control then passes to a function to determine if an empty adapter memory offset list entry is found 305. If an empty adapter memory offset list entry is found, control passes to a function to provide access to this memory offset through system address space 310. A new adapter memory segment is thus generated and written into the list 311. Control then passes to functions 312 and 313 to convert the newly written offset into a system address and to return this system address to the requesting software, and finally to exit the decision flow 350. If an empty adapter memory offset list entry is not found, control passes to a function to scan for a removable memory offset list entry 306. Control then passes to a function to determine whether a removable memory offset list entry is found 307. If a removable memory offset list entry is found, control passes to a function to remove the removable memory offset list entry 309. Control then passes to functions 310, 311, 312, and 313 to write a new memory offset list entry to replace then one removed by function 309 and convert the address of the newly written memory offset list entry into a system address which is returned to the requesting software prior to control exiting the decision flow 350. If a removable memory offset list entry is not found, then control passes to a function to return a memory access error message to the requesting software 308. Control then exits the decision flow 350. FIG. 3 shows a decision flow of an application attempting to read adapter memory. The decision flow to ensure adapter memory can be accessed through system address space is identical for an application attempting to read or write to adapter memory. With reference thereof, element 301 is the function call the application uses to access (read or write) adapter memory with offset X.

Element 302 implements the scan of the sorted array, locating the entry whose segment offset combined with segment length encompasses the adapter memory offset X. For example, if X was 418, and three adjacent entries in the sorted array contained offset 256/length 256, offset 512/length 512, and offset 1024/length 1024, then the entry corresponding to offset 256 is used, since it encompasses all segment offsets from 256 up to 511, 418 falling within that range.

Element 303 is just a decision of whether an entry was found in the array that represented a memory segment and length encompassing offset X. If an appropriate entry is located, then element 312 is the function that converts the offset X into a system space offset Y, usable by the CPU. Function then passes to element 313 to allow the application to use the system space address.

Element 304 is the function that searches for an empty memory offset list entry that may be used to hold a new adapter memory offset for system address space conversion.

Element 305 is a decision of whether a free entry was found in the array, or not. If a free entry was found, then control passes to element 310 and an Operating System mechanism used for allowing adapter memory to be accessed through system address space is invoked. The resulting memory offset to system address list entry is then inserted into the array, denoted by element 311, and normal flow of execution passes to element 312. If no free entry is found, control passes to element 306, which scans the array for a removable entry, based on the entries' status information.

Element 307 is a decision of whether a removable entry was found or not. If a removable entry was found, then control passes to element 309, and an Operating System mechanism provided to release system resource when adapter memory no longer needs to be accessed through system address space is invoked. The entry is then removed from the list, and control is passed to element 310. Normal execution flow as described above continues. If a removable entry was not found, control passes to element 308, and an Operating System mechanism provided for notifying an application that it may not access adapter memory is invoked. It is obvious to one skilled in the art that certain enhancements could be made to the data flow described in FIG. 3 including, but not limited to, waiting or retrying element 307 to element 302 if no removable entry was found, as well as using binary searches, hashes, trees, b-trees, and other performance related algorithms to minimize system overhead in trying to satisfy a request from element 301 up through element 313.

The invention can also be included in a kit. The kit can include some, or all, of the components that compose the invention. The kit can be an in-the-field retrofit kit to improve existing systems that are capable of incorporating the invention. The kit can include software, firmware and/or hardware for carrying out the invention. The kit can also contain instructions for practicing the invention. Unless otherwise specified, the components, software, firmware, hardware and/or instructions of the kit can be the same as those used in the invention.

The term approximately, as used herein, is defined as at least close to a given value (e.g., preferably within 10% of, more preferably within 1% of, and most preferably within 0.1% of). The term substantially, as used herein, is defined as at least approaching a given state (e.g., preferably within 10% of, more preferably within 1% of, and most preferably within 0.1% of). The term coupled, as used herein, is defined as connected, although not necessarily directly, and not necessarily mechanically. The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system. The terms including and/or having, as used herein, are defined as comprising (i.e., open language). The terms a or an, as used herein, are defined as one or more than one. The term another, as used herein, is defined as at least a second or more.

While not being limited to any particular performance indicator or diagnostic identifier, preferred embodiments of the invention can be identified one at a time by testing for the ability to access the totality of RAM located on adapter cards through a system address space of a computer system with limited system resources. The test for this ability can be carried out without undue experimentation by the use of a simple and conventional memory access test.

Practical Applications of the Invention

A practical application of the invention that has value within the technological arts is in applications requiring multiple CPUs to access shared RAM. Further, the invention is useful in conjunction with Internet devices catering to a multiple CPU environment (such as are used for the purpose of website hosting), or in conjunction with Local Area Networks (LAN), or the like. There are virtually innumerable uses for the invention, all of which need not be detailed here.

Advantages of the Invention

Adapter memory access management, representing an embodiment of the invention, can be cost effective and advantageous for at least the following reasons. The invention improves quality and/or reduces costs compared to previous approaches.

This invention is most valuable in an environment where there are significantly large sections of RAM located on adapter cards, all of which have need to be accessed by software running on a computer system. The invention facilitates total utilization of RAM located on adapter cards, thereby reducing costs and alleviating space constraints associated with adding additional RAM adapter cards.

All the disclosed embodiments of the invention disclosed herein can be made and used without undue experimentation in light of the disclosure. Although the best mode of carrying out the invention contemplated by the inventors is disclosed, practice of the invention is not limited thereto. Accordingly, it will be appreciated by those skilled in the art that the invention may be practiced otherwise than as specifically described herein.

Further, variation may be made in the steps or in the sequence of steps composing methods described herein.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. A method, comprising:

receiving a request to access a memory card address that lies outside a processor access range;

scanning a data structure including a list of adapter memory segment offsets, each adapter memory segment offset associated with a memory adapter, for a suitable adapter memory segment offset;

determining if a suitable adapter memory segment offset is available;

converting the suitable adapter memory segment offset to a system address; and providing a processor with access to the suitable adapter memory segment offset via the system address.

2. The method of claim 1, wherein the data structure is resident in a shared memory unit.

3. The method of claim 1, further comprising returning a memory access message if the suitable adapter memory segment offset is not available.

4. A method, comprising:

scanning a data structure including a list of adapter memory segment offsets, each adapter memory segment offset associated with a memory adapter, for an empty entry;

determining if an empty entry is available;

providing access to the empty entry through a system address space;

writing a new adapter memory segment offset into the list of adapter memory segment offsets at the empty entry;

converting the new adapter memory segment offset to a system address; and providing a processor with access to the new adapter memory segment offset via the system address.

5. The method of claim 4, further comprising returning a memory access message if the empty entry is not available.

6. A method, comprising:

scanning a data structure including a list of adapter memory segment offsets, each adapter memory segment offset associated with a memory adapter, for a removable entry;

determining if a removable entry is available;

removing the removable entry from the list of adapter memory segment offsets, thus creating an empty entry;

providing access to the empty entry through a system address space;

writing a new adapter memory segment offset into the list of adapter memory segment offsets at the empty entry;

converting the new adapter memory segment offset to a system address; and providing a processor with access to the new adapter memory segment offset via the system address.

7. The method of claim 6, further comprising returning a memory access error if the removable entry is not found.

* * * * *